United States Patent Office 3,824,235
Patented July 16, 1974

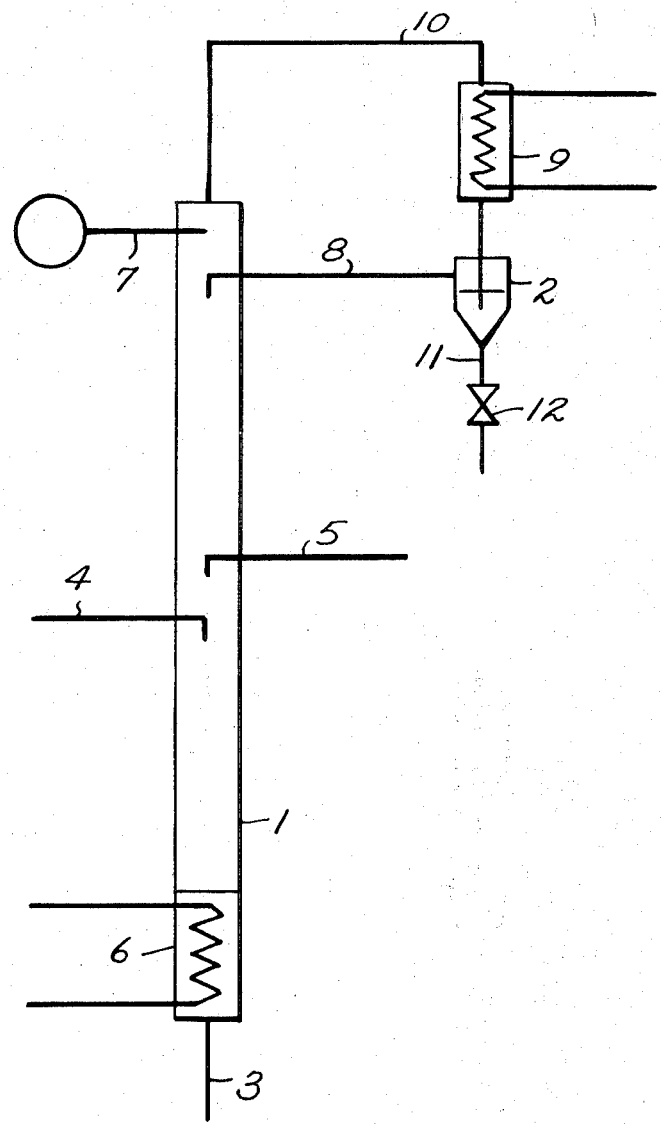

3,824,235
PROCESS FOR THE EPOXIDATION OF UNSATURATED COMPOUNDS
Axel Kleemann, Oberursel, Manfred Krüger, Offenbach, Gerd Schreyer, Grossauheim, Otto Weiberg, Neu-Isenburg, and Wolfgang Weigert, Offenbach, Germany, assignors to Deutsche Gold- und Silber-Scheideanstalt vormals Roessler, Frankfurt am Main, Germany
Original application Aug. 4, 1970, Ser. No. 60,872, now Patent No. 3,708,507. Divided and this application Aug. 23, 1972, Ser. No. 283,040
Claims priority, application Germany, Aug. 21, 1969, P 19 42 557.1
Int. Cl. C07d 1/08, 1/16, 1/18
U.S. Cl. 260—348.5 L                    7 Claims

ABSTRACT OF THE DISCLOSURE

Olefinically unsaturated organic compounds are epoxidized with solutions of organic percarboxylic acid. An aqueous solution of the percarboxylic acid having at least 2 carbon atoms is dehydrated by extraction and/or distillation with the compound to be epoxidized. The dehydrated product is held at 30–100° C. and subjected to a subsequent reaction.

---

This is a division of application Ser. No. 60,872, filed Aug. 4, 1970 and now U.S. Pat. No. 3,708,507.

The invention is concerned with a process of epoxidizing olefinically unsaturated (i.e. ethylenically unsaturated) compounds which are difficult to epoxidize.

It is known to convert materials having olefinically unsaturated double bonds to the corresponding epoxides using water free solutions of peracetic acid in a suitable inert solvent (see Frostick et al., Jour. Amer. Chem. Soc. 81, 3350 (1959)). Although this process is used to the greatest practicable extent in many cases long reaction times are required, especially with olefins that are difficulty epoxidizable, as, for example, esters or ethers having an allylic double bond as well as olefins with a terminal double bond. Besides there must be made allowance for unsatisfactory reactions and yields. In this case the presence of the solvent necessary for the peracetic acid noticeably reduces the concentration of the reaction and also must be again separated and therefore represents a ballast.

It is also known to react the epoxidizable liquid compounds countercurrently with peracetic acid or perpropionic acid. The process, however, only proceeds favorably if the per acid is used in strong dilution with organic compounds such as acetic acid or in the presence of acetaldehyde or an organic solvent such as acetone (Celanese, English Pat. 1,053,972). Otherwise the danger of explosion is too great. Therefore the process is primarily operated with raw gases from the acetaldehyde oxidization (Kreisler, German Pat. 1,266,302 and Celanese British Pat. 1,053,972).

It has now been found that olefinically unsaturated, difficulty epoxidizable water insoluble compounds can be epoxidized in an industrially simple and less dangerous form with organic percarboxylic acids which contain at least 2 carbon atoms, if one proceeds with an aqueous solution of this per carboxylic acid and removes water with help of the compounds to be epoxidized by extraction and/or azeotropic distillation. The thus obtained water free solution of percarboxylic acid in the excess unsaturated compound is then held at 30–100° C. until the desired reaction of percarboxylic acid with the olefinic compound to form the corresponding epoxide is obtained. Preferably the reaction is continued until the percarboxylic acid is completely reacted, since in such case the working up is greatly simplified.

In the event the olefinic compound to be epoxidized forms a minimum azeotrope with water it is brought in excess amount, into contact with pure aqueous percarboxylic acid in a suitable distillation column equipped with a water trap in which case a water free solution of percarboxylic acid in the unsaturated compound collects in the sump while the water in the form of an azeotrope with the unsaturated compound is removed in vapor form overhead and after condensation of the vapors in the water trap is separated from the unsaturated compound which latter is again returned to the column.

The invention will be understood best in connection with the drawings wherein the single figure is a diagrammatic illustration of a continuous azeotropic distillation according to the invention.

Referring more specifically to the drawings there is provided a distillation column 1. Percarboxylic acid solution is introduced by way of conduit 5 and the compound to be epoxidized is introduced via conduit 4. The column is also equipped with heat exchanger 6 and thermometer 7. The azeotrope of water and unsaturated compound is led via conduit 10 and heat exchanger 9 into water trap 2 whereby after the separation the recovered unsaturated compound is returned to the column via conduit 8 while the water leaves the system via conduit 11 and valve 12. The solution of percarboxylic acid in the compound to be epoxidized collecting in the sump of column 1 is withdrawn via conduit 3.

The pressure in the column should be adjusted so that the sump temperature is the region in which no significant destruction takes place of the percarboxylic acid employed. Preferably the temperature is between 20 and 80° C. but it can be as low as 0° C. or as high as 110° C. In the process of the azeotropic removal of water there already takes place a partial reaction to the epoxide. For complete reaction the sump product is subjected to a subsequent reaction at 30–100° C.

In another form of the invention the percarboxylic acids can be extracted from their aqueous solution by the unsaturated compounds themselves which are to be epoxidized employing known processes for extraction. Thus there can be used any of the processes disclosed in the article in Vauck-Müller, Grundoperationen Chemischer Verfahrenstechnik (1966) pages 662 et seq. The entire disclosure of the article in Vauck-Müller is hereby incorporated by reference. After the extraction the solution of percarboxylic acid in the compound to be epoxidized is subjected to a subsequent reaction at 30–100° C. The extraction, like the azeotropic dehydration, can be carried out continuously or batchwise. If the percarboxylic acid extract still contains small amounts of water these can be easily removed by a subsequent azeotropic dehydration, for example in the manner described above.

The aqueous solutions of percarboxylic acids employed can be used in any desired concentration of the percarboxylic acid. Preferably they are pure aqueous solutions in the concentrations which are produced, for example by the processes described in German Pat. 1,165,576, German Auslegeschrift 1,170,926 and Weiberg U.S. Pat. 3,264,346, e.g. about 40 to 60% of lower peralkanoic acid and 60 to 40% of water by weight although the water can vary from 20 to 50% by weight. Examples of suitable percarboxylic acids include peracetic acid, perpropionic acid, perbutyric acid, perisobutyric acid and pervaleric acid i.e., peralkanoic acids having 2 to 5 carbons.

The molar proportions of olefinically unsaturated compound to the percarboxylic acid can be adjusted at pleasure and is not critical. Preferably the proportions range between 1.2 and 25 to 1.

The working up of the reaction mixture obtained by the process of the invention can take place in known manner, for example by distillation or extraction.

3

As difficultly epoxidizable compounds which can be employed in the described epoxidation process mention is made of the following:

Unsaturated hydrocarbons (for example diisobutylene, styrene, para menthene, octadecene-1, nonene-2, octylene, alpha-pinene, camphene, beta-pinene, stilbene, cycloheptene, alpha carotene, beta carotene, limonene, dihydronaphthalene, indene, cyclohexene, cyclopentadiene, heptene-1, hexene-1, isoprene, limonene, p-methyl styrene, 1-vinyl cyclohexane), allyl and vinyl esters (for example allyl acetate, allyl propionate, vinyl acetate, vinyl stearate, allyl stearate, allyl butyrate, vinyl hexanonate), unsaturated ethers (for example, diallyl ether, 2-methallyl ethyl ether, di (2-methallyl) ether, ethyl vinyl ether, divinyl ether, allyl 2-methyl propen-2-yl ether, allyl methyl cyclohexen-3-yl ether, allyl butene-2-yl ether, allyl ethyl ether, allyl cyclopenten-2-yl ether, allyl vinyl ether, allyl octyl ether, vinyl methyl ether, vinyl isobutyl ether, allyl methvl ether), unsaturated alcohols (for example 1-buten-3-ol, 1-penten-ol-3, cinnamyl alcohol, allyl alcohol, crotyl alcohol, oleyl alcohol, citronellol, geraniol, linalool, alpha terpineol) and allyl halides (for example allyl chloride and allyl bromide). It will be observed that in the above list of compounds the olefinically unsaturated hydrocarbons have 5 to 40 carbon atoms, the allyl and vinyl esters are esters of alkanoic acids having 2 to 18 carbon atoms, the ethers are vinyl and allyl ethers and the alcohols are ethylenically unsaturated hydrocarbyl alcohols having 3 to 18 carbon atoms. Generally the unsaturated compounds are liquids so that the percarboxylic acid can be dissolved therein.

The technical advance of the process of the invention first of all is in the possibility of using percarboxylic acids for oxidation in an essentially safer manner than could be done in the former vapor phase addition. By use of the unsaturated compound itself as the extractant or diluent the reaction time is sharply reduced because of the increased concentration of both the peracid and unsaturated compound compared with the known processes using solutions of percarboxylic acids in inert solvents. At the same time the yields are increased over those obtained with epoxidation processes with vapor form percarboxylic acids (for example compare British Pat. 1,053,972, Example 6). Additionally the working up is simplified since besides the unsaturated compound added in excess and the carboxylic acid arising from the percarboxylic acid no materials need to be separated from the reaction product. By the resulting higher space-time-yields the capacity of an existing plant can be considerably increased and the expense for the apparatus necessary for the working up reduced. In carrying out the process in continuous fashion the water free mixture of percarboxylic acid and unsaturated compound are completely reacted, suitably by passing through correspondingly temperature regulated reaction tubes.

Unless otherwise indicated all parts and percentages are by weight.

The following examples further serve to illustrate the invention.

EXAMPLE 1

A mixture of 500 grams (5 moles) of allyl acetate and 121.3 grams of aqueous peracetic acid (47.7 weight percent peracetic acid, 0.75 mol) was azeotropically dehydrated in a vacuum (42 Torr) in a 1 meter Vigreux column having a water trap. The sump temperature of the column did not exceed 36° C. The separated water still contained 0.044 mol of peracetic acid which was returned to the column having an insufficient selectivity capacity. The sump product was subsequently held at normal pressure at a temperature of 50° C. whereby after 12 hours peracid was no longer detectable in the reaction mixture. By working up with a vacuum distillation to a maximum bath temperature of 50° C. there were obtained 67.7 grams of pure glycidyl acetate. This corresponds to a yield of 91% of theory based on the peracetic acids.

EXAMPLE 2

In the apparatus shown in the drawing (effective column height 2 meters) 2.5 mols of a 50.8 weight percent aqueous peracetic acid together with 8 mols (800 grams) of allyl acetate were dehydrated in a vacuum at a sump temperature of 50° C. The subsequent reaction to quantitative peracetic acid reaction took 13 hours at 50° C. By working up in a distillation there were obtained 258 grams of glycidyl acetate which corresponds to a yield of 89% of theory based on the peracetic acid.

EXAMPLE 3

In a 50 mm. diameter 2.50 meter long glass column filled with Raschig rings and equipped with a water trap and a return line for the organic phase separated from the head of the column at normal pressure there were continuously added hourly between the upper and middle thirds of the column 127 grams of aqueous peracetic acid (46.9 weight percent peracetic acid, 0.785 mol), and between the middle and the lower third of the column 492 grams (6.43 mols) of allyl chloride. The peracetic acid was dehydrated azeotropically. The sump temperature did not exceed 48° C. The water separated per hour still contained 0.0024 mol of peracetic acid. The correspondingly drawn off sump product had a peracetic acid content of about 6.5 weight percent (or 0.47 mol/hour), i.e. there had already occurred about a 40% reaction of the peracetic acid.

The sump product was subsequently held in a glass flask for 6 hours with reflux boiling at normal pressure at 50° C. By gas chromatography and titrimetrical determination of the epoxide in the reaction mixture there were found 12.8 weight percent epichlorohydrin and by titrimetrical determination there was found 0.12 weight percent of peracetic acid. This corresponds to a 98.7% peracetic acid reaction and an analytically detected epichlordydrin yield of 97% of theory based on the peracetic acid.

EXAMPLE 4

In a 50 mm. diameter extraction column having 30 perforated plates (20% passage) and having an outer mantle cooled to about 5° C. There were continuously fed in countercurrent flow 3000 grams per hour (39.2 mol/hour) of allyl chloride and 407 grams per hour of aqueous peracetic acid (51.9 weight percent, 2.77 mol/hour). The continuously withdrawn organic phase (3160 grams/hour) contained 5.0 weight percent of peracetic acid (2.08 mol/hour), and 0.16 weight percent water (0.28 mol/hour). From 1000 grams of this mixture (0.66 mol peracetic acid; 12.40 mols allyl chloride; 0.09 mol water) there were distilled off in a packed column to remove water as an azeotrope with allyl chloride a total of 516 grams of allyl chloride and water at atmospheric pressure. The sump still contained 6.5 weight percent (0.415 mol) of peracetic acid, i.e. about 37% of the reaction of the peracetic acid had already taken place.

The sump product was subsequently held in a glass flask for 6 hours with reflux boiling at normal pressure at 46–50° C. In the reaction mixture there was found 11.6 weight percent epichlorhydrin (0.605 mol) by titrimetrical determination and 0.09 weight percent peracetic acid (0.006 mol) by titrimetrical determination. This corresponds to a 99% peracetic acid reaction and a yield of epichlorhydrin of 92% of theory based on the peracetic acid.

What is claimed is:

1. A process for the liquid phase epoxidation of a liquid olefinically unsaturated compound selected from the group consisting of olefinically unsaturated hydrocarbons having 5 to 40 carbon atoms, allyl and vinyl esters of alkanoic acids having 2 to 18 carbon atoms, allyl and vinyl ethers, allyl chloride, allyl bromide and ethylenically unsaturated hydrocarbyl alcohols having 3 to 18 carbon atoms and forming a minimum azeotrope with water comprising continuously countercurrently extracting a peralkanoic acid having 2 to 5 carbon atoms from an aqueous solution thereof by contacting the aqueous solution with said olefinically unsaturated compound, removing the residual water from the extract by azeotropic distillation and then holding the solution of said peralkanoic acid in the liquid epoxidizable compound at 30 to 100° C. until the epoxidation is completed.

2. A process according to claim 1 wherein the peralkanoic acid is peracetic acid.

3. A process according to claim 1 wherein the molar proportion of olefinically unsaturated compound to percarboxylic acid is between 1.2 and 25 to 1.

4. A process according to claim 1 wherein the olefinically unsaturated compound is diisobutylene, styrene, allyl acetate, diallyl ether, 2-methylallyl ether, 1-buten-3-ol or allyl choride.

5. A process according to claim 1 wherein the unsaturated compound is allyl acetate.

6. A process according to claim 1 wherein the olefinically unsaturated compound is allyl acetate or allyl chloride.

7. A process according to claim 6 wherein the olefinically unsaturated compound is allyl chloride.

References Cited
FOREIGN PATENTS 794,373   4/1958   Great Britain ____ 260—348.5 L NORMA S. MILESTONE, Primary Examiner